Dec. 14, 1954

P. M. STIVENDER

AUTOMATIC POWER PLANT

Filed Sept. 28, 1951

Inventor
Paul M. Stivender
By Willets, Helmig & Baillio
Attorneys

Dec. 14, 1954

P. M. STIVENDER 2,697,174

AUTOMATIC POWER PLANT

Filed Sept. 28, 1951

Inventor
Paul M. Stivender
By
Willits, Helwig & Baillio
Attorneys

Dec. 14, 1954

P. M. STIVENDER
AUTOMATIC POWER PLANT 2,697,174

Filed Sept. 28, 1951

Inventor
Paul M. Stivender
By Willits, Helwig & Baillie
Attorneys

United States Patent Office 2,697,174
Patented Dec. 14, 1954

2,697,174

AUTOMATIC POWER PLANT

Paul Macon Stivender, South Euclid, Ohio, assignor to General Motors Corporation, Detroit, Mich., a corporation of Delaware Application September 28, 1951, Serial No. 248,765

27 Claims. (Cl. 290—4)

This invention generally relates to generating electric power plants and more particularly to automatic generating electric power plants and automatic starting and stopping controls therefor.

Generating electric power plants comprising a prime mover and an alternating current generator driven thereby fo use as an unattended power plant require starting, speed matching, synchronizing, loading and stopping means as well as protection means to prevent damage thereto. Such controls are necessarily complicated and require frequent inspection and servicing.

The principal object of the present invention is to provide a Diesel engine driving an alternating current generator constituting a power plan and automatic control means including engine starting, speed matching, synchronizing, loading and shut down means arranged to operate in sequence wherein the completion of one step in the sequence initiates the next step and the provision of time limit and other protective control means to stop and reinitiate sequential control operation a number of times and automatic shut-down and lock-out of the control means upon failure to complete the sequence and automatic shut-down of the power plant when minor defects occur with automatic restarting and shut-down and lock-out of the controls upon the occurrence of major defects with annunciators to indicate the cause of the shut-down and also shut-down and lock-out of the power plant.

The combination of power generating and control means by which this object is accomplished, together with other novel features of the invention, will become apparent by reference to the following detailed description and drawings illustrating the invention.

Figure 2:
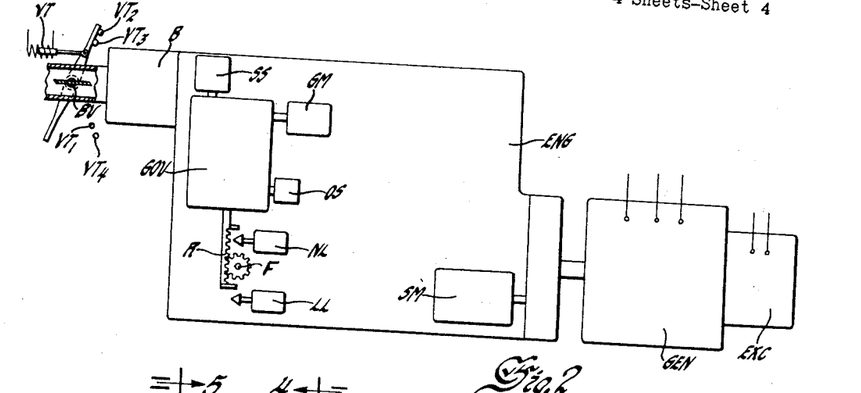
Figures 2 is a schematic view of the power plant and controls therefor shown in Figure 1.

As best seen in Figure 2 of the drawings, the power plant comprises a diesel engine ENG serving as a prime mover and a three phase alternating current generator GEN and a direct current exciter EXC directly connected to and driven by the engine for exciting the generator.

A direct current engine starting motor shown at SM is provided with a conventional releasable cranking gear for cranking of the engine by the starting motor, the cranking gear being releasable upon starting of the engine in a well known manner. The engine ENG is also provided with a conventional governor GOV driven thereby and including speed setting means and hydraulic compensating and servo means, not shown, for actuating a fuel rack R connected to the engine fuel regulating shaft F to cause operation of the engine and generator at substantially constant speed and at a value determined by the setting of the governor speed setting means in a well known manner. A governor no-load limit or synchronous speed switch NL and a load limit switch LL, each having contacts operable by spaced abutments, are shown on the engine fuel rack R.

The governor is provided with a conventional governor starting solenoid SS which is deenergizable to cause cut-off of fuel to stop the engine and energizable to render the governor and governor servo operative to control the engine fuel and speed. A reversible governor motor GM is provided to increase and decrease the governor speed setting. An overspeed switch OS is also provided on the governor GOV.

The engine ENG is provided with a scavenging and supercharging blower B driven by the engine and having a spring loaded latched open inlet valve BV which is tripped by an emergency engine shut-down solenoid VT which is energized to close the inlet valve BV and thereby provide a prompt shut-down of the engine. The valve BV is arranged to be opened manually after closure of the tripping solenoid VT.

Figure 1A:
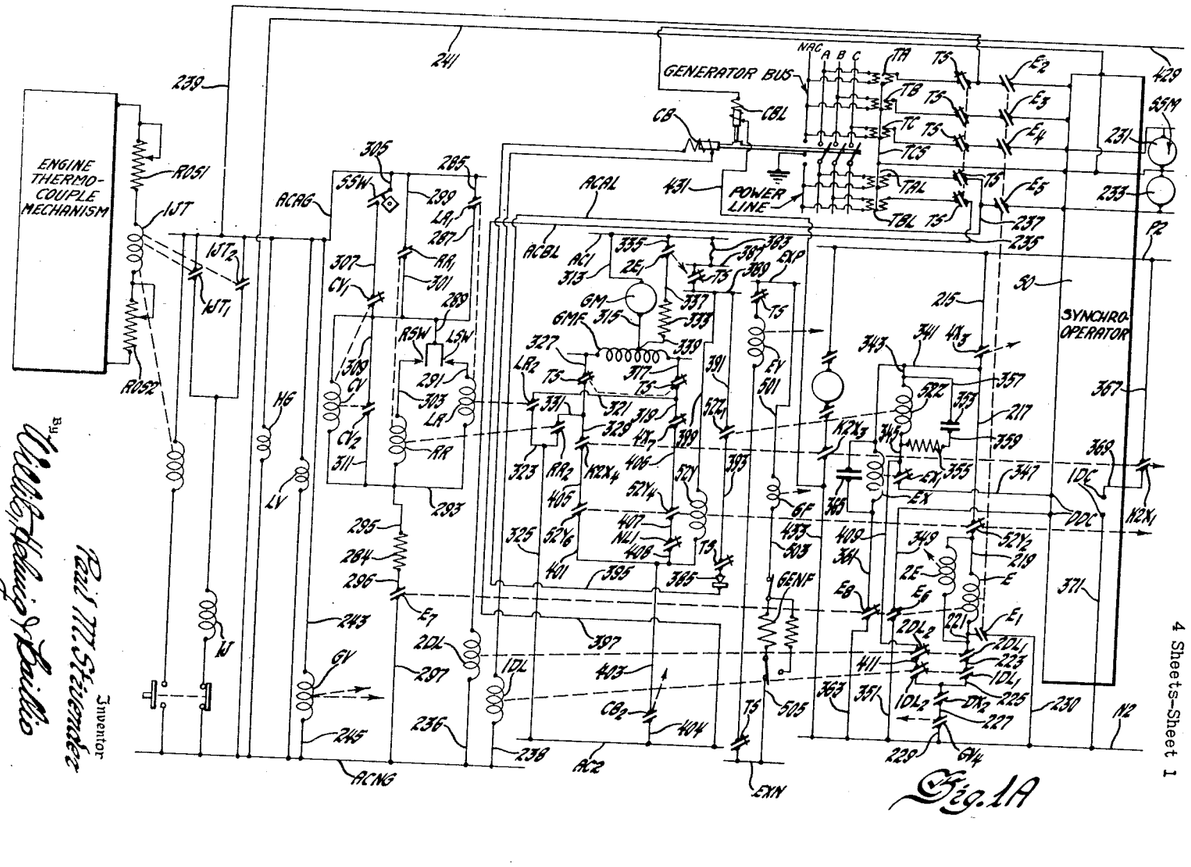
Figures 1A, 1B and 1C, taken together, constitute a schematic view of the control system.
Figure 1B:
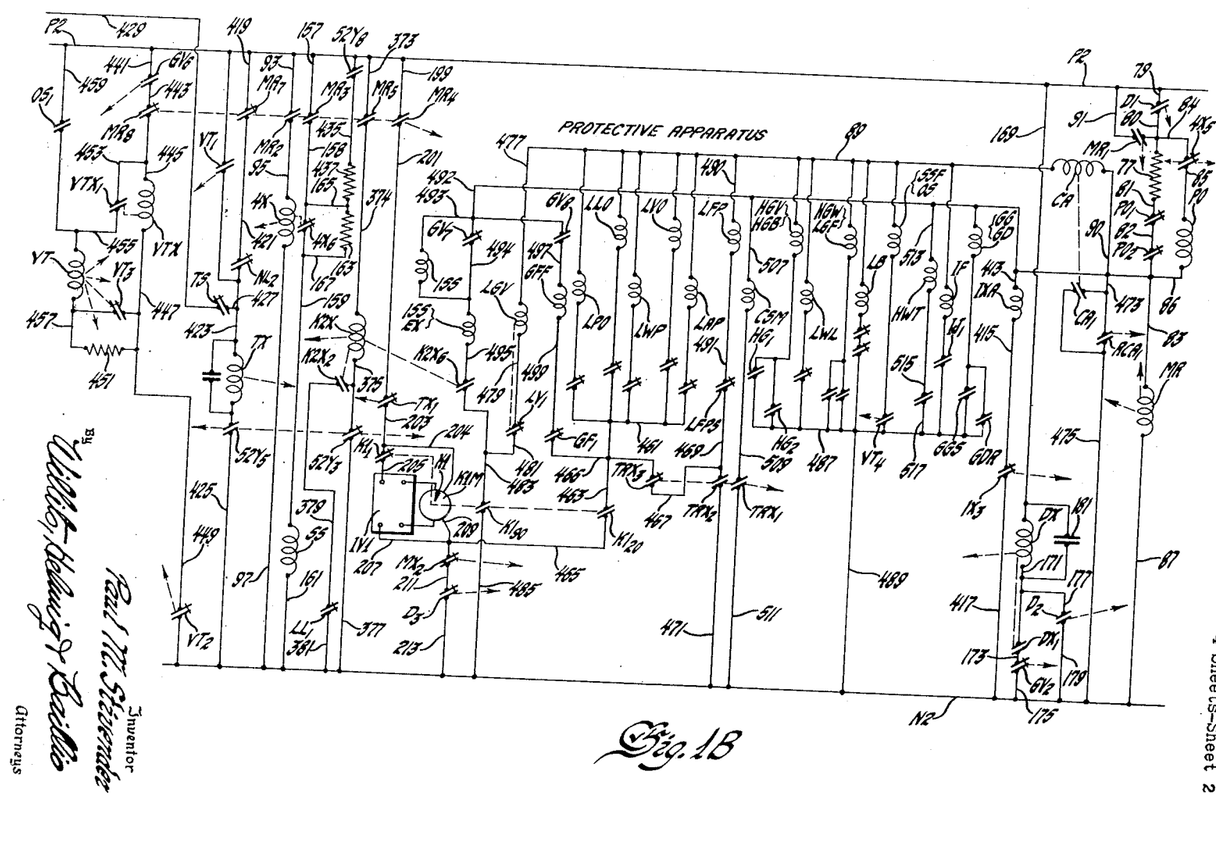
Figure 1C:
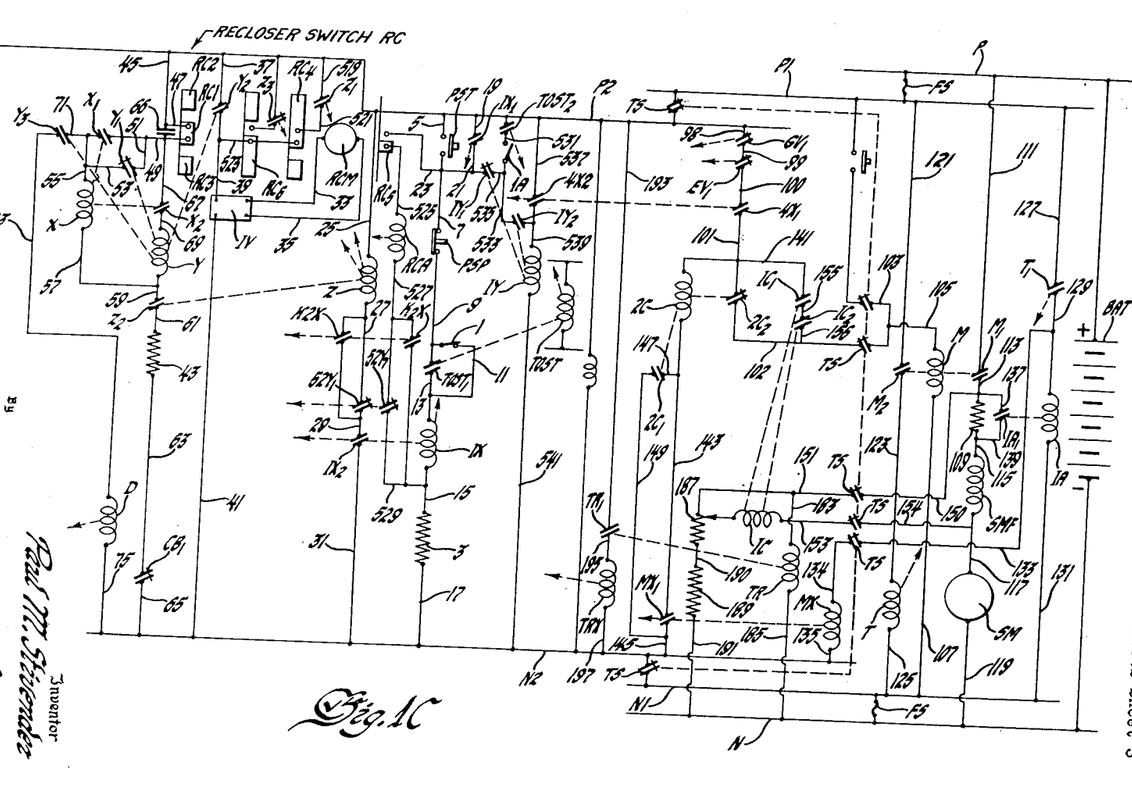

As best illustrated in Figure 1C, a battery BAT is shown connected between positive and negative battery connectors P and N. Another battery control line comprising positive and negative controls P1 and N1 are shown connected by fuses FS with the conductors P and N. A third battery control line comprising positive and negative control conductors P2 and N2 are shown connected to the conductors P1 and N1 by the closed contacts of a multi-contact transfer switch TS which is manually movable between the automatic engine starting position, shown, to a manual engine starting position.

Starting and stopping of the power plant may be accomplished by a time operated switch TOST of the synchronous clock type connected to a suitable source of alternating current, or by a push button starting switch PST.

Closure of the starting push button switch PST closes a circuit between the positive and negative conductors P2 and N2 through a closed push button stopping switch PSP, a closed shunting switch 1 for the normally open contacts TOST1 of the time operated switch TOST for the power plant, the winding of a stopping or shut-down relay IX, a resistor 3 and conductors 5, 7, 9, 11, 13, 15 and 17. This causes energization of the winding of the relay IX and closure of the two normally open contacts IX1 and IX2 (Fig. 1C) thereof and the opening of the normally closed contacts thereof IX3 (Fig. 1B). Closure of the contacts IX1 which are holding contacts and are shown connected in shunt relation with the starting push button PST between the conductors P2 and 7 by conductors 19, 21 and 23 maintains the winding of the relay IX energized. Closure of the contacts IX2 completes an energizing circuit between the positive and negative conductors P2 and N2 through the winding of a relay Z and the normally closed contacts 52Y1 of a relay 52Y (Fig. 1A) and conductors 25, 27, 29 and 31.

Energization of the winding of the relay Z causes closure of the contacts Z1 and Z2 thereof and the opening of the contacts Z3 thereof. Closure of the contacts Z2 completes a circuit for the winding of a relay X between the positive and negative conductors P2 and N2 through the stationary set of contacts of a conventional synchronous motor operated drum recloser switch RC shown bridged by a contact of RC1 on a drum of this switch which is driven by a synchronous motor RCM. The motor RCM is shown connected by conductors 33 and 35 across the alternating current contacts of an inverter IV. The direct current input terminals of the inverter IV are connected in series with the normally open contacts of Y2 of the relay Y between the positive and negative conductors P2 and N2 by conductors 37, 39 and 41. The energizing circuit to the winding of the relay X, in addition to the bridged stationary contacts RC1 of the recloser switch RC is through the normally closed contacts Y1 of the relay Y, the now closed contacts Z2 of the relay Z, a resistor 43, the normally closed interlocking contacts CB1 of a main circuit breaker CB (Fig. 1A) and conductors 45, 47, 49, 51, 53, 55, 57, 59, 61, 63 and 65. A condenser 66 is connected across the conductors 47 and 49 which are connected to the stationary contacts of the recloser switch RC now bridged by the contact RC1 thereof. This causes energization of the winding of the relay X and the closure of the normally open holding contacts X1 thereof for this relay winding which contacts are connected in series with the conductors 49 and 55 and also causes the closure of the contacts $X_2$ thereof. The now closed contacts $X_2$ are connected in series with the winding of the relay Y between conductors 49 and 59 by conductors 67 and 69 and the winding of the relay Y is also energized to open the contacts $Y_1$ and close the contacts $Y_2$ and $Y_3$ thereof.

Closure of the contacts $Y_2$ completes the direct current input circuit to the inverter IV and causes rotation of the synchronous motor RCM driving the drum of the drum recloser switch RC.

Closure of the contacts $Y_3$, which are connected in series with the holding contacts $X_1$ and the winding of a relay D between the conductor 49 and negative conductor $N_2$ by conductors 71, 73 and 75, serves to energize the winding of the relay D. The conductor 71 is also connected to the conductor 55.

Energization of the winding of the relay D causes the closure of the normally open contacts $D_1$ and $D_2$ thereof and causes the opening of the normally closed contacts $D_3$ thereof, shown in Figure 1B.

Closure of the contacts $D_1$ causes energization of the winding of a master relay MR through the following circuit connections. A limiting resistor 77 is connected in series with the now closed contacts $D_1$ and two normally closed contacts $PO_1$ and $PO_2$ of a protective relay PO with one winding terminal of the master relay MR by conductors 79, 80, 81, 82 and 83. The winding of the protective relay PO and the normally closed contacts $4X_5$ of a relay 4X are connected in shunt relation with the limiting resistor 77 by conductors 84, 85, and 86. The other side of the winding of the master relay MR is connected by a conductor 87 to the negative control conductor $N_2$. The winding of the master relay MR will be accordingly energized upon closure of the contacts $D_1$ through the closed contacts $4X_5$ and the winding of the relay PO, which shunt the limiting resistor 77, and the conductors 79, 80, 84, 85, 86, 83 and 87, some of this current also flowing through the limiting resistor 77 and closed contacts $PO_1$ and $PO_2$ of the protective relay PO until these relay contacts are opened by energization of the winding thereof. The conductor 86 serves one conductor of a shut-down control line for protecting control annunciator apparatus, to be described, and the other conductor 89 of this shut-down line is connected to one terminal of a common lock-out annunciator coil CA and the opposite terminal of this coil is connected by a conductor 90 to the conductor 86. A normally open set of holding contacts $MR_1$ for the master relay winding is connected between the conductor 85 and the positive conductor $P_2$ by a conductor 91.

Energization of the winding of the master relay MR causes the closure of the normally open contacts $MR_1$, $MR_2$, $MR_3$, $MR_4$ and $MR_5$ and causes the opening of the normally closed contacts $MR_7$ and $MR_8$ of this relay.

Closure of the holding contacts $MR_1$ establishes a holding circuit for the master relay winding through the conductors $P_2$, 91, 80, 84, 85, 86, 83 and 87.

Closure of the master relay contacts $MR_2$, shown in the upper left of Figure 1B, establishes a circuit for the winding of the relay 4X through these contacts $MR_2$ and the conductors 93, 95 and 97 connected between the positive and negative conductors $P_2$ and $N_2$. This causes closure of the normally open contacts $4X_1$, $4X_2$ and $4X_3$ and opening of the normally closed contacts $4X_5$, $4X_6$ and $4X_7$ of the relay 4X.

Opening of the contacts of the relay $4X_5$, shown in Figure 1B, deenergizes the winding of the relay PO connected in shunt relation to the limiting resistor 77 in the circuit to winding of the master relay MR and the contacts $PO_1$ and $PO_2$ of the relay PO close to insert the limiting resistor 77 in series with the winding of the master relay MR to prevent overheating thereof as this relay is continuously energized to maintain the control system operable.

Closure of the contacts $4X_1$, shown in Figure 1C, establishes an energizing circuit between the positive and negative conductors $P_2$ and $N_1$ for the winding of a main starting motor contactor M for the engine starting motor SM through the normally closed contacts $GV_1$ and $EV_1$ of generator and exciter voltage relays GV and EV (Fig. 1A) and through the closed contacts TS of the transfer switch and conductors 98, 99, 100, 101, 102, 103, 105 and 107. This causes the closure of the main contacts $M_1$ and auxiliary contacts $M_2$ of the starting motor contactor M. When the main contact $M_1$ closes, a circuit is established through the starting motor armature and series field SMF and a limiting resistor 109 and the conductors 111, 113, 115, 117 and 119 connected between the positive and negative battery conductors P and N. The engine ENG is then rotated by the starting motor SM. The closure of the auxiliary contacts $M_2$ of the starting motor contactor M establishes an energizing circuit between the positive and negative conductors $P_1$ and $N_1$ through the winding of a time delay relay T and conductors 121, 123 and 125 to cause a slight delay in the closure of the contacts $T_1$ of this relay in order to establish an energizing circuit between the conductors $P_1$, $N_1$ and $N_2$ for the windings of relays IA and MX. The energizing circuit for the winding of relay IA comprises the now closed contacts $T_1$ of the time delay relay T and the conductors 127, 129 and 131 between the conductors $P_1$ and $N_1$, and the energizing circuit for the winding of the relay MX comprises the closed contacts $T_1$ and one set of normally closed contacts of the transfer switch TS and the conductors 129, 133, 134 and 135 and negative conductor $N_1$.

Energization of the winding of the relay IA causes the closure of its contacts $IA_1$, connected across the limiting resistor 109 by the conductors 137 and 139, to short this limiting resistor and increase the current supplied by the battery BAT to the starting motor SM.

Energization of the winding of the relay MX causes the closure of the normally open contacts $MX_1$ and causes the opening of the normally closed contacts $MX_2$ thereof. Closure of the contacts $MX_1$ closes a circuit for the winding of a relay 2C comprising conductors 141, 143 and 145 connected between the conductors 101 and $N_2$. This causes the contacts $2C_1$ to close and the contacts $2C_2$ to open. Closure of the contacts $2C_1$ establishes a return holding circuit for the winding of the relay 2C around the contacts $MX_1$ by means of the conductors 147 and 149 connected between conductors 143 and 145. The contacts $2C_2$ are connected in shunt relation with the normally open contacts $IC_1$ and $IC_2$ of a voltage relay IC having a winding connected in shunt relation with the series field winding SMF of the starting motor SM and the limiting resistor 109 therefor between conductors 113 and 117 by means of two sets of closed contacts of the transfer switch TS and conductors 150, 151, 153 and 154. The winding of the relay IC is accordingly energized by the voltage drop across the starting motor series field SMF and resistor 109 and this causes the closure of the contacts $IC_1$ and $IC_2$ which are connected by conductors 155 and 156 between conductors 101, 102, and 141 and in shunt relation with the now open contacts $2C_2$ of the relay 2C. The then closed contacts $IC_1$ and $IC_2$ maintain the winding of the contactor M energized.

The governor starting solenoid SS, see Figure 1B, is energized upon closure of the contacts $MR_3$ of the master relay MR at the same time the contacts $MR_2$ are closed to energize the winding of the relay 4X. The closure of the contacts $MR_3$ establishes a circuit from the conductors $P_2$ and $N_2$ through the normally closed contacts $4X_6$ of the relay 4X and the governor starting solenoid SS and conductors 157, 158, 159 and 161 and the contacts $4X_6$ open slightly later to shunt in a limiting resistor 163 connected by conductors 165 and 167 across the contacts $4X_6$. By doing this, a heavy current is initially supplied to the governor solenoid SS before the contacts $4X_6$ open to insert the limiting resistor 163 in series with the solenoid to limit the current therein. This insures prompt starting action of the engine governor GOV to quickly increase the engine speed and prevents overheating of the governor solenoid SS which is continuously energized in order to retain the governor operative.

The engine ENG normally starts within one second after rotation by the starting motor SM and its speed rises to the no-load synchronous value in three to four seconds with a rise in the engine lubricating oil, fuel and cooling water pressure to the normal value. The subsequent speed matching, synchronizing, and loading steps in the control sequence, to be described, normally take place within ten seconds.

When the engine starts, the counter E. M. F. voltage of the starting motor SM overcomes the voltage drop across the series field winding SMF and the current through the winding of the relay IC connected across this field is reduced sufficiently to cause the relay contacts $IC_1$ and $IC_2$ to open and deenergize the winding of the contactor M. This causes the main contacts $M_1$ of the contactor M to open and deenergize the starting motor SM. The overrunning clutch mechanism connecting the starting motor SM with the engine ENG is released by the engine overrunning the starting motor and the starting motor will stop. The auxiliary contacts M2 of the contactor M open simultaneously to deenergize the winding of the time relay T and its contacts T1 open to deenergize the windings of the relay IA and MX and the contacts thereof fall to the normal position. Before the contacts 2C2 close, the voltage of the generator GEN and exciter EXC has built up to a value necessary to supply sufficient current to the windings of the voltage relays GV and EV to cause the contacts GV1 and EV1 to open and isolate the winding of the starting motor contactor M. The winding of the voltage relay GV is shown in Figure 1A and, as will be subsequently described, is connected across one phase of the generator GEN comprising the generator conductors ACAG and ACNG. The winding of the voltage relay EV, also shown in Figure 1A, is shown connected directly across the positive and negative exciter conductors EXP and EXN by two sets of contacts of the transfer switch TS. The field of the generator GENF is also shown connected across the exciter line conductors EXP and EXN.

The speed matching step of the control sequence occurs next, when the engine speed rises to substantially the no-load synchronous speed value by energization of the windings of the generator and exciter voltage relays GV and EV. The recloser drum contact RC1 is moved out of bridging relation with the stationary contacts of the recloser RC in three or four seconds after energization of the synchronous motor RCM driving the recloser drum. This causes deenergization of the winding of the relays X, Y and D but the winding of a relay DX, shown in Figure 1B, which was energized when the contacts D2 of the relay D were closed remains energized. The winding of this relay DX is connected between the positive and negative conductors P2 and N2 through the normally open holding contacts DX1 of this relay, the normally closed contacts GV2 before opening thereof and conductors 169, 171, 173 and 175. The now open contacts D2 of the relay D are connected across the contacts DX1 and GV2 by conductors 177 and 179. A condenser 181 is also connected across the winding of the relay DX. The contacts D2 of the relay D, when initially closed, energized the winding of the relay DX and the holding contacts DX1 thereof closed to keep this relay winding energized after deenergization of the winding of the relay D and the opening of the contacts D2 thereof by the four second delay in opening of the stationary contacts of the recloser RC by the drum contact RC1 thereof. As mentioned, a condenser 181 is connected across the winding of the relay DX to delay the decay of flux thereof upon the opening of the contacts GV2 of the generator voltage relay to delay the opening of the normally open holding contacts DX1 and to delay closure of the normally open contacts DX2, shown in Figure 1A, which initiates the starting of the speed matcher mechanism SSM shown in Figures 3, 4, 5 and 1A. Closure of the contacts DX2 causes energization of winding of the relay E to cause starting of the speed matching step in the control sequence if the engine starts promptly.

As will be subsequently explained, should the engine fail to start promptly a ten second time delay relay TR is provided to limit cranking of the engine ENG by the starting motor SM to ten seconds. This relay is shown in Figure 1C provided with a winding connected across the series field winding and armature of the starting motor SM between the conductors 151 and N by conductors 183 and 185 and is also energized by closure of the main contacts M1 of the contactor M with the starting motor SM to cause closure of the relay contacts TR1 in ten seconds. A rheostat 187 and resistor 189 are also connected by conductors 190 and 191 between the conductors 151 and N and in shunt relation with the winding of the relay TR. When the contacts TR1 of the relay TR close in ten seconds the winding of a stopping relay TRX is connected in series with these contacts by conductors 193, 195 and 197 between conductors P2 and N2 and the winding of the relay TRX is then energized. This causes closure of the normally open contacts TRX1 and TRX2 and causes the opening of the normally closed contacts TRX3 shown in Figure 1B as part of the potective apparatus. As will be explained, the opening of the normally closed contacts TRX3 prevents interruption of the control sequence.

If the engine starts within the ten second cranking period, as determined by the ten second time delay cranking limit relay TR, the opening of the main contacts M1 of the starting motor contactor deenergizes the cranking limit relay and substitutes a conventional synchronous motor driven time delay relay K1 having a twenty and a ninety second set of contacts. The twenty second set of contacts gives sufficient time for the engine oil, fuel and water pressure to build up to the proper value and the ninety second set of contacts gives sufficient time for the generator and exciter voltage to build up and to complete the speed matching, synchronizing and loading steps of the control sequence.

The time delay relay K1, shown in Figure 1B, includes a synchronous clock motor K1M shown connected across the alternating current output terminals of an inverter IV1 to close the normally open contacts K1$_{20}$ in twenty seconds and to close the other normally open contacts K1$_{90}$ in ninety seconds. A normally closed set of starting contacts K1$_1$ are also provided which are closed upon closure and subsequent opening of the contacts K1$_{90}$ by the motor K1M to cause restarting thereof. The normally closed contacts K1$_1$ are shown connected in series with the direct current input terminals of the inverter IV1 (Fig. 1B), the now closed, normally open contacts MR4 of the master relay MR, the normally closed contacts TX1 of a relay TX, the normally closed contacts D3 and MX2 and by the conductors 199, 201, 203, 204, 205, 207, 209, 211 and 213 between the positive and negative conductors P2 and N2. This circuit is completed when the contacts D3 and MX2 drop to the normally closed position when the engine starts and the winding of the starting motor contactor M is deenergized. The contacts K1$_{90}$ and K1$_{20}$ are also connected to the protective means in a manner to be described to shut-down and lock-out the control system after a second and a third starting failure spaced two minutes apart of the stationary contacts of the recloser switch RC by the drum contacts RC2 and RC3.

The speed matching step, as mentioned previously, is initiated upon energization of the winding of the relay E after the engine speed has risen, under control of the governor GOV, to approximately synchronous speed and the frequency and phase angle of the generator voltage must then be matched to that of the power line before the circuit breaker CB may be closed so that the power plant may then supply part of the load demand on the power line. A voltage regulator, not shown, of conventional type automatically adjusts the generator field current supplied by the exciter EXC to regulate the generator voltage in a well known manner.

As previously explained, the normally open contacts DX2 of the relay DX, when closed, initiates the speed matching step of the control sequence. The now closed contacts DX2 are shown in Figure 1A connected between the positive and negative conductors P2 and N2 and in series with the winding of the relay E, the now closed contacts 4X3 of the relay 4X, the normally closed contacts 52Y2 of the relay 52Y and the normally open, now closed contacts GV4, 1DL1, and 2DL1 of the generator voltage relay GV and the dead line relays 1DL and 2DL, respectively, by conductors 215, 217, 219, 221, 223, 225, 227 and 229. This causes energization of the winding of the relay E and closure of the holding contacts E1 thereof shown connected by a conductor 230 between the conductors 221 and N2 to keep this relay winding energized, and also to cause the closure of the contacts E2, E3, E4, E5, E6 and E7 and the opening of the contacts E8.

Closure of the contacts E2, E3, E4 and E5 which are shown in the upper right hand portion of Figure 1A, connects one synchronous motor 231 of the differential speed matcher mechanism SSM across one phase of the generator bus and connects the other synchronous motor 233 across one phase of the power line shown in Figure 1A, and closure of the contacts E7 inserts the speed raise and lower switches RSW and LSW and slip cycle switch SSW of the speed matching mechanism SSM across the generator alternating current control conductors ACAG and ACNG. A synchronizing mechanism of any well known type used in power stations for connecting alternating current generators in parallel is provided, such as a synchro-operator SO shown in United States Patent No. 2,100,364. The synchro-operator SO is also connected to the generator bus and power line upon closure of the contacts $E_2$, $E_3$, $E_4$ and $E_5$ of the relay E to control the closing of the circuit breaker CB. As best seen in the upper portion of Figure 1A, a transformer TA has its primary winding shown connected between the neutral NAC and phase A conductor of the generator bus and the secondary winding is shown connected between a common transformer secondary conductor TCS and one terminal of the synchro-operator SO through a closed contact of the transfer switch TS and the closed contacts $E_2$ of the relay E. Another transformer TB has its primary winding shown connected between the neutral NAC and phase B conductor of the generator bus and its secondary winding is shown connected between the common transformer secondary conductor TCS and a conductor shown connected to another terminal of the synchro-operator SO through another closed control of the transfer switch and the closed contacts $E_3$ of the relay E. A third transformer TC has its primary winding shown connected across the neutral NAC and phase C conductors of the generator and the secondary winding is shown connected between the common secondary conductor TCS and one terminal of the synchro-operator SO and one terminal of the synchronous motor 231 of the speed matching mechanism SSM through another closed contact of the transfer switch TS and the closed contacts $E_4$ of the relay E. The opposite terminal of the motor 231 and one terminal of the other synchronous motor 233 are shown connected by a conductor to the common transformer secondary conductor. Another transformer TAL has its primary winding shown connected across the neutral NAC and phase A conductor of the outside power line and the secondary winding is shown connected across the common transformer secondary conductor TCS and one terminal of the synchro-operator SO and the other terminal of the synchronous motor 233 of the speed matching mechanism SSM. Another transformer TBL has its primary winding shown connected across the neutral NAC and phase B conductors of the power line and the secondary winding is shown connected between the common transformer secondary conductor TCS and a conductor 235 through another closed contact of the transfer switch TS. The conductor 235 is connected in series with the winding of the dead line relay 2DL by a conductor 236 to the alternating current control line conductor ACNG. A conductor 237 is connected between the input side of the contacts $E_5$ of the relay E and in series with the winding of the other dead line relay 1DL by a conductor 238 to the alternating current control line conductor ACNG. Another conductor 239 is connected between the generator input side of the contacts $E_2$ and the generator alternating current control conductor ACAG and another conductor 241 is connected between the common transformer secondary conductor TCS and one terminal of the synchro-operator SO and the alternating current control conductor ACNG. The winding of the generator voltage relay GV, previously mentioned, is connected between the alternating current generator control conductors ACAG and ACNG by conductors 243 and 245. The winding of the generator voltage relay GV is accordingly energized by the generator GEN and the dead line relay 1DL and 2DL are accordingly energized by the power line and the contacts $1DL_1$, $1DL_2$, $2DL_1$, and $2DL_2$ of the dead line relays 1DL and 2DL are moved to the opposite positions from the normal positions shown, upon energization of these windings.

Figure 3:
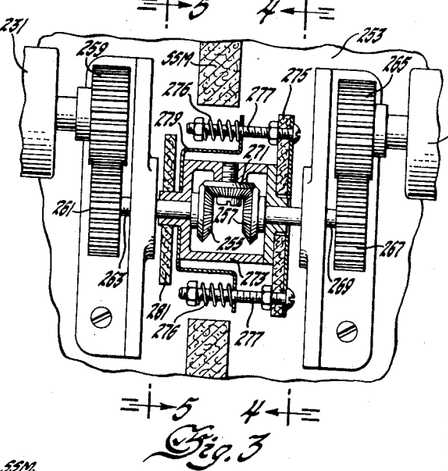
Figure 3 is a plan view of a control device illustrated in Figure 1A with parts shown broken away and in section.
Figure 4:
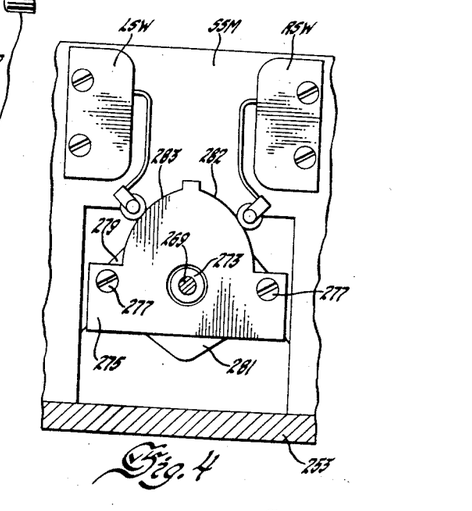
Figure 4 is an end elevation view taken on line 4—4 of Figure 3 with parts shown broken away and in section.
Figure 5:
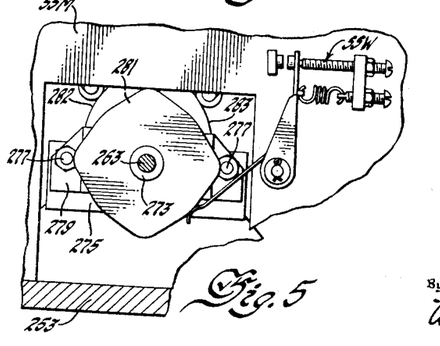
Figure 5 is an end elevation view taken on line 5—5 of Figure 3 with parts shown broken away and in section.

As best seen in Figures 3, 4 and 5, each of the synchronous motors 231 and 233 of the differential speed matching mechanism SSM are mounted in the frame 253 of the speed matching mechanism SSM. Each of the motors 231 and 233 drive one of the bevel input gears 255 and 257 of a differential gear mechanism by through separate driving gears. The shaft of the synchronous motors 231, energized by the generator GEN, drives the bevel input gear 255 through a pinion gear 259 on the motor shaft and a gear 261 on the input shaft 263 on which the input bevel gear 255 is secured.

The shaft of the synchronous motor 233, energized from the power line, drives the bevel input gear 257 through a pinion gear 265 on this motor shaft and a gear 267 on the input shaft 269 on which the bevel gear 257 is secured. The input shafts 263 and 269 are supported by suitable bearings on the frame 253 of the speed matching mechanism SSM.

An output bevel gear 271 meshes with the input gears 255 and 257 having the same number of teeth and the output gear 271 is rotatable in a cage 273 which is rotatable on the input shafts 263 and 269. The ratio of the pinion and driving gears 259 and 261 differs slightly from the ratio of the pinion 265 and driving gear 267 so that when the speed of the input shafts 263 and 267 are equal and rotating in opposite directions and the cage 271 is stationary, the frequency of the generator is one fourth percent higher than the frequency of the power line. This permits quick synchronizing and insures that the generator and line voltages will not remain out of phase longer than seven and one-third seconds. A two part brake comprising a raise and lower switch operating member 275 is rotatable on one end hub of the cage 273 and is held in frictional engagement with the adjacent end face of the cage by springs 276 on bolts 277 having nuts thereon and secured to the member 275. These bolts 277 extend through openings in another member 279 which is rotatable on the opposite end hub of the cage 273 and also held in frictional engagement with the adjacent opposite end face of the cage by the springs 276. A slip switch operating cam 281 is secured on the hub of the cage 273 adjacent the member 279. As best seen in Figure 4, a speed raise switch RSW and a speed lower switch LSW is mounted on the frame 253 adjacent the switch operating member 275 and these switches are engageable by separate cam portions 282 and 283 thereon. The cam portion 282 being rotated in one direction to close the raise speed switch RSW when the engine ENG and generator GEN are operating below the synchronous speed of the power line and the cam portion 283 is rotatable in the opposite direction to close the lower speed switch LSW when the engine and generator are operating above the synchronous speed of the power line. A slip cycle switch SSW is located on the frame 254 adjacent the slip switch operating cam 281 and is closed thereby each slip cycle of the differential cage member 273.

As best seen in Figure 1A the speed raise and lower switches RSW and LSW and the slip cycle switch SSW of the speed matching mechanism are connected between the generator alternating current control conductors ACAG and ACNG.

The speed lower switch LSW is connected in series with winding and holding contacts $LR_1$ of a speed lower relay LR, a resistor 284, the now closed, normally open contacts $E_7$ of the relay E between the control conductors ACAG and ACNG by conductors 285, 287, 289, 291, 293, 295, 296 and 297.

The speed raise switch RSW is connected in series with the holding contacts $RR_1$ and the winding of a speed raise relay RR between the conductors ACAG and 295 by conductors 299, 301, 287, 289 and 303.

The slip cycle switch SSW is connected in series with the normally closed contacts $CV_1$ and the winding of a short interval time delay relay CV between the conductors ACAG and 295 by conductors 305, 307, 309, 287 and 293 and a normally open set of contacts $CV_2$ of the time delay relay CV are connected across the winding thereof by the conductor 309 and a conductor 311.

With the above connections the speed raise switch RSW is closed, when the engine and generator are operating below synchronous speed and when the slip switch SSW also closed, each slip cycle, the winding of the speed raise relay RR will be energized through the closed contacts of the slip switch SSW, the normally closed contacts $CV_1$ of the time delay relay CV, the closed raise switch RSW and conductors ACAG, 305, 307, 309, 287, 289, 303 and 295, the resistor 284, the closed contacts $E_7$ of the relay E and conductors 297 and ACNG. This causes closure of the holding contacts $RR_1$ of the speed raise relay to maintain the winding of this relay energized. The winding of the time delay relay CV is also connected across the winding of the speed raise relay RR by conductors 287 and 293 and is also energized to cause a slight delay in closure of the contacts $CV_2$, and a corresponding slight delay in the opening of the contacts $CV_1$ of the time delay relay CV. This slight delay in closure of the contacts CV₂ connected directly across the windings of the relays RR and CV shorts these windings and the contacts RR₁ and RR₂ and the contacts CV₁ and CV₂ fall to the normal position shortly after being moved from this position.

Likewise when the speed lower switch LSW is closed by operation of the engine and generator above synchronous speed and the slip switch SSW is also closed each slip cycle and the winding of the speed lower relay LR is energized through the conductors ACAG, 305, 307, 309, 287, 289, 291, 293 and 295, the resistor 284, the closed contacts E₇ of the relay E and conductors 297 and ACNG and the time delay relay CV also acts to deenergize the winding of the relay LR shortly after energization thereof.

The short interval of closure of the contacts LR₂ of the speed lower relay LR momentarily completes a circuit to the split field winding GMF of the alternating current governor motor GM from an alternating current line AC1 and AC2 through the armature and one part of the field GMF of the governor motor GM, a closed contact of the transfer switch TS, the closed contacts LR₂ of the speed lower relay LR and conductors AC1, 313, 315, 317, 319, 321, 323, 325 and AC2. This lowers the speed setting of the engine governor GOV momentarily during the short interval of closure of the contacts LR₂ of the speed lower relay.

Likewise the short interval of closure of the contacts RR₂ of the speed raise relay RR completes a circuit to the armature and field of the governor GM through the armature and another portion of this field, another closed contact of the transfer switch TS, the closed contacts RR₂ of the speed raise relay RR and conductors AC1, 313, 315, 327, 329, 331, 323, 325 and AC2. This causes a momentary increase in the speed setting of the engine governor GOV to raise the engine speed during the interval of closure of the contacts RR₂ of the speed raise relay RR. The above intermittent speed setting operation continues until the condition is met whereby both the frequency and phase angle of the generator is substantially matched with the power line to cause closure of the circuit breaker CB between the generator bus and the power line by action of the synchro-operator SO.

A resistor 333 shown connected in series with the contacts 2E₁ of a relay 2E across the armature of the governor motor GM by conductors 335, 337 and 339 so that the resistor 333 is placed in shunt relation with the armature of the governor motor GM to regulate the speed of the motor upon closure of the contacts 2E₁ of the relay 2E. The winding of the relay 2E is shown connected in shunt relation with the winding of the relay E, which starts the speed matching step, and the winding of the raly 2E is accordingly energized with the winding of the relay E to cause closure of the contacts 2E₁ in order to regulate the speed of the governor motor GM and thereby match the speed of engine and generator with the power line in small steps as described above.

The synchro-operator SO, as previously mentioned, was energized at the same time as the contacts E₂, E₃ E₄ and E₅ of the relay E were closed to start the speed matching mechanism SSM. A plurality of synchronizing contacts operating a plurality of alternating current relays are provided in the synchro-operator which are operated in a preselected sequence when the relative frequency difference between the generator and power line is one sixth cycle or less to energize direct current relays also included in the synchro-operator SO to complete a direct current circuit between the positive and negative conductors P2 and N2 to the winding of a circuit breaker closing relay 52Z. This direct current circuit, as best seen in the lower right of Figure 1A, includes the now closed contacts 4X₃ of the relay 4X, the winding of the circuit breaker closing relay 52Z, the normally closed contacts EX₁ of the relay EX, the direct current output terminals DDC connected to the direct current relays of the synchro-operator and the now closed contacts E₆ of the relay E and conductors 215, 217, 341, 343, 345, 347, 349 and 351. A condenser 353 and a resistor 355 are connected in series by conductors 357 and 359 across the winding of the circuit breaker closing relay 52Z to cause a two second delay in decay of the flux in this winding in order to retain the contacts 52Z₁ thereof closed for two seconds to insure closing of the main circuit breaker CB, shown connected between the generator and the power line, and to make sure the circuit breaker is latched in a closed position. The winding of a relay EX is shown connected in series with now opened contacts E₈ between the conductors 341 and N2 by conductors 361 and 363 and a condenser 365 is connected across the winding of the relay EX.

The direct current supply to the synchro-operator SO between the positive and negative conductors P2 and N2 is through the now closed, normally open contacts K2X₁ of a relay K2X shown connected in series with the direct current input terminals 1DC of the synchro-operator SO and conductors 367, 369 and 371. The winding of the relay K2X, shown in the upper left Figure 1B, is connected between the positive and negative conductors P2 and N2 through the now closed, normally open contacts MR₅ of the master relay MR, the normally closed contacts 52Y₃ of the relay 52Y and conductors 373, 374, 375 and 377. Energization of the winding of the relay K2X also caused closure of the holding contacts thereof K2X₂, conneccted in series with the normally closed contacts LL₁ governor load limit switch LL and conductors 379 and 381 connected between the conductors 375 and N2 to establish a holding circuit for the winding of the relay K2X.

The contacts of the relay E, as described, start the speed matching mechanism SSM and the synchro-operator SO simultaneously and as there is a possibility that the synchro-operator would cause closure of the circuit breaker as soon as the contacts E close, in order to delay closure of the circuit breaker CB until the synchro-operator is operating properly the time delay relay EX is provided. As explained when the winding of the relay E was energized the normally closed contacts E₈ thereof and the winding of the relay EX are connected in series by conductors 343, 341, 361 and 363 and in shunt relation with the winding of the circuit breaker closing relay, the winding of the relay EX is accordingly energized simultaneously with the winding of relay 52Y. The condenser 365 across the winding of the relay EX delays the decay of flux in this winding and a two second delay in closure of the normally closed contacts EX₁ thereof to cause energization of the winding of the circuit breaker closing relay 52Z and closure of the contacts 52Z₁ thereof. The energizing circuit for the winding of the relay 52Z comprising the conductors 215, 341, 343, 345, 347, the contacts EX₁, closed after this delay of two seconds, the direct current output terminals DDC of the synchro-operator SO and conductors 349 and 351. The two second delay in closure of the contacts EX₁ then energizes the winding of the circuit breaker closing relay 52Z and its contacts 52Z₁ close to energize the closing winding of circuit breaker CB, the condenser 353 and resistor 355 across the winding of the relay 52Z delaying the opening of the contacts 52Z₁ for about two seconds insures energization of the circuit breaker closing coil for two seconds to insure closure and latching in of the circuit breaker CB. The contacts 52Z₁ are connected in series with a fuse 383, two sets of closed contacts of the transfer switch TS, a rectifier 385 and the closing winding of the circuit breaker CB by conductors 387, 389, 391, 393, 395 and 397 between the alternating current conductors AC1, and AC2 and when the contacts 52Z₁ close, the circuit breaker closing coil is energized to connect the generator bus with the power line.

The closure of the circuit breaker CB starts the loading step in the control sequence to cause the engine ENG and generator GEN to assume part of the load on the power line. Closure of the circuit breaker CB causes closure of another set of interlocking contacts CB₂ thereof connected in series with the winding of the relay 52Y between the alternating current conductors AC1 and AC2 by the fuse 383, one closed contact of the transfer switch TS and conductors 387, 389, 399, 401, 403, the closed contacts CB₂ of the circuit breaker CB and conductor 404. This energizes the winding of the relay 52Y and causes the closure of the contacts 52Y₄, 52Y₅, 52Y₆, and 52Y₈ thereof and causes the opening of the contacts 52Y₁, 52Y₂, 52Y₃, and 52Y₇ thereof.

The opening of the contacts 52Y₂ deenergizes the windings of the relay E and 2E to energize the speed matching mechanism SSM and synchro-operator SO.

The closure of the contacts 52Y₆, shown connected in series by conductor 405 with the now closed contacts K2X$_4$ of the relay K2X between the conductors 329 and 401 establishes a circuit to the governor motor GM causing it to increase the governor speed setting above the no load synchronous speed of the generator and thereby move the engine fuel rack R toward the fuel rack maximum fuel and load setting and when the fuel rack R moves to this position an abutment thereon opens the contacts LL$_1$ of the governor load limit switch LL in the holding circuit of the winding of the relay K2X and the contacts K2X$_4$ open to deenergize the governor motor GM and hold the governor speed setting in the maximum load limit setting.

The generator GEN then supplies part of the load to the power line and the K1$_{90}$ contacts of the time delay K1 open ninety seconds later as the starting, speed matching, synchronizing and loading steps of the sequence are completed before this ninety second interval.

Should the outside line be deenergized or dead there is no necessity for the speed matching and synchronizing steps of the control sequence. The windings of the dead line relays 1DL and 2DL will remain deenergized if the outside power line is dead and the contacts 1DL$_1$ and 2DL$_1$ of the dead line relays will remain open to prevent energization of the relay E and thereby prevent starting of the speed matching mechanism SSM and the synchro-operator. When the generator voltage rises to a value to energize the winding of the generator voltage relay GV, the winding of the circuit breaker closing relay 52Z will be energized through the normally closed contacts 1DL$_2$ and 2DL$_2$ of the dead line relays which are connected by conductors 409 and 411 between the conductors 345 and 225 and in shunt relation with the windings of the relays 2E and E. This causes closure of the circuit breaker without starting of the speed matching and synchro-operator mechanisms SSM and SO.

Stopping of the power plant is initiated by any means which deenergizes the circuit including the winding of the IX relay serving as a stopping or shut-down relay to shunt the winding of the master relay MR or any of the protective means, to be described, which shunts the winding of the master relay MR.

The following events occur upon shut-down of the power plant by any of these means.

For example if the stop push button PSP is pressed to open the circuit of the winding of the power plant stopping or shut-down relay IX as shown in Figure 1C the normally closed contact IX$_3$ short circuits the winding of the master relay MR through these contacts and the coil of a normal shut-down annunciator IXA connected by conductors 413, 415 and 417 between the shut-down control conductor 86 and the negative conductor N2, as best seen in the right hand side of Figure 1B. This causes the master relay contacts to move to the normal position and the contacts MR$_2$ thereof open to deenergize the winding of the relay 4X. This causes the contacts 4X$_6$ to close and energize the governor motor GM to decrease the speed setting of the governor and the engine fuel rack R is moved toward the off fuel position by the governor GOV. More specifically deenergization of the relay 4X of Figure 1B closes the contacts 4X$_6$ and 4X$_7$ (Fig. 1A) thereof. The governor motor GM is then energized from lines AC$_1$ and AC$_2$ through a circuit including conductors 313, 315, part of the split field GMF of the reversible governor motor, conductor 317, transfer switch contacts TS, conductor 319, the now closed contacts 4X$_7$ of the relay 4X, conductor 406, the now closed contacts 52Y$_4$ of the relay 52Y (which was previously energized upon initiation of the loading step in the control sequence described hereinabove), conductor 407, the normally closed contacts NL$_1$ of the governor no-load speed limit switch NL, conductor 408, conductors 403 and 401, the closed contacts CB$_2$ of the circuit breaker CB and conductor 404 to the other side of the AC line, AC$_2$. When the rack moves to the no load synchronous speed position an abutment on the rack opens the contacts NL$_1$ of the governor no load limit switch NL connected in series with the contacts 4X$_7$ to stop the rack R in this position. Another set of contacts NL$_2$ of the no load limit switch NL close to energize the winding of the circuit breaker latch CBL which releases this latch and the circuit breaker will be opened by its trip spring, not shown. The contacts NL$_2$ of the governor no load limit switch NL are shown on the left hand side of the Figure 1B connected in series with the normally closed contacts MR$_7$ of the master relay, the winding of a relay TX and the now closed contacts 52Y$_5$ across the positive and negative conductors P$_2$ and N$_2$ by conductors 419, 421, 423 and 425. The winding of the relay TX will also be energized when the contacts NL$_2$ of the no load limit switch NL close. The energizing winding of the circuit breaker latch CBL is shown in the upper right hand side of Figure 1A and the left hand side of Figure 1B connected in series with a set of closed contacts of the transfer switch TS and the conductors 427, 429, 431 and 433 between the conductor 423 and the negative control conductor N2. The opening of the circuit breaker CB causes the interlocking contact CB$_2$ to open and thereby open the circuit of the winding of the relay 52Y, shown in Figure 1A, and its contacts 52Y$_8$ open to deenergize the governor starting winding SS to cause shut-down of the engine. The contacts 52Y$_8$ are shown in the upper left of Figure 1B connected in series by a conductor 435 with a resistor 437 between the positive control conductor P2 and the limiting resistor 163 in the governor starting winding circuit and when the contacts 52Y$_8$ open the energizing circuit to the governor starting winding SS is opened to cause shut-down of the engine ENG as the circuit to this winding was through both of the resistors 437 and 163 when the contacts MR$_2$ of the master relay MR opened previously. Shut-down of the engine leaves the speed setting of the governor GOV set in the no-load synchronous speed setting when the governor starting solenoid is reenergized.

When the contacts MR$_8$, shown in the upper left of Figure 1B, were closed an energizing circuit was set up between the positive and negative control conductors P2 and N2 to the winding of a thirty second time delay relay VTX having normally open contacts VTX$_1$ which close in thirty seconds to energize the engine shut-down solenoid VT and cause the inlet valve BV of the engine driven blower B to close and thereby promptly shut down the engine ENG. It will be noted in the upper left of Figure 1B, that the winding of the thirty second time delay relay VTX is connected across the conductors P2 and N2 in series with the normally open contacts GV$_6$ of the generator voltage relay GV, the normally closed contacts MR$_8$ of the master relay MR and the normally closed contacts VT$_2$, shown in Figure 2, on the engine blower valve, when opened, by conductors 441, 443, 445, 447 and 449. When the blower valve BV closes the contacts VT$_2$ open to deenergize the winding of the solenoid VT and the blower valve BV can only be opened manually. This solenoid VT is connected in series with a resistor 451 and the normally open contacts VTX$_1$ of the relay VTX between conductors 445 and 447 by conductors 453, 455 and 457 and therefore in shunt relation with the winding of the time delay relay VTX. Another normally closed set of contacts VT$_3$ on the blower valve BV are connected across the resistor 451 and when the contacts VT$_3$ open the resistor 451 limits the current in the winding of the solenoid VT. A normally open set of contacts OS$_1$ of an overspeed switch OS operated by the governor GOV are connected in series between the positive control conductor P2 and the conductor 455 by a conductor 459 to cause immediate energization of the shut-down solenoid VT and prompt closure of the blower inlet valve and shut-down of the engine if it overspeeds. A third set of normally open contacts VT$_1$ are shown connected in shunt relation with the master relay contacts MR$_8$ and the governor no load limit switch contacts NL$_2$ and when the blower valve closes the circuit to the circuit breaker latch release winding CBL is completed to open the circuit breaker. Another normally open set of contacts VT$_4$ on the blower valve, to be referred to, also close.

The other protective devices provided, are divided into two classes, those which shut the power plant down for temporary defects but allow automatic restarting and others which shut the power plant down and lock out the controls to prevent automatic restarting upon the occurrence of a major defect in the power plant. The operation of each of the following protective devices short circuit the winding of the master relay MR through a separate conventional, electrical annunciator having a coil which, when energized, trips a leaf which drops by gravity in conventional manner. Each annunciator leaf is provided with a printed ticket visible upon drop out of the annunciator leaf to inform a maintenance man of the particular defect which caused shut-down of the power plant.

These annunciators shown in the central portion of Figure 1B are in addition to the normal shut-down annunciator IXA and the common lock-out annunciator CA, already mentioned, which are also provided with a leaf which drops out, and are provided with tickets visible on drop out.

The common lock-out annunciator CA is provided with a normally open set of contacts $CA_1$ which close upon energization of the coil thereof to prevent restarting of the power plant when the following defects occur and continue for twenty or ninety seconds as regulated by the time delay relay K1 which, as mentioned, is provided with twenty and ninety second contacts. One terminal of each of the five coils of engine annunciators indicating low piston oil pressure LPO, low lubricating oil pressure LLO, low cooling water pressure LWP, low lubricating oil viscosity LVO and low cooling radiator air pressure LAP are shown in Figure 1B connected in series with the coil of the common annunciator CA through the shut-down control line conductor 86. The opposite terminal of each of these annunciators are shown connected in series with one side of a separate switch, shown below each coil, and acting in response to the particular engine condition mentioned above and indicated by a ticket on an annunciator leaf and the other side of each of these switches are shown connected to a conductor 461. The conductor 461 is shown connected to the negative control conductor N2 through the twenty second contact $K1_{20}$ of the time delay relay K1, the contacts $MX_2$ of the relay MX and the contacts $D_3$ of the relay D by the conductors 463 and 465 and conductors 209, 211 and 213. The conductor 463 is also connected to the negative control conductor N2 through the contacts $TRX_3$ and $TRX_2$ of the relay TRX and conductors 466, 467, 469 and 471. By means of these connections each of the coils of the annunciator LPO, LLO, LWP, LVO, LAP and LFP and the respective switches therefor, acting in response to a dangerous engine condition are connected in a shunt relation to the winding of the master relay MR to shunt this winding and cause shut-down of the power plant, in the manner previously described, and to also lock out the controls twenty seconds after starting of the control sequence if the master relay MR and relay D are not energized by this time. The coil of the common annunciator CA connected in series with each of these annunciators, when energized, causes gravity drop out and closure of the contacts $CA_1$ thereof which are connected in parallel with the contacts $RCA_1$ of a recloser switch lock-out annunciator RCA to be subsequently described. The contacts $RCA_1$ also drop out and close when recloser annunciator coil is energized and these contacts $RCA_1$ are connected in shunt relation with the winding of the master relay MR by conductors 473 and 475 to shunt the winding of the master relay MR and the coil of the common annunciator causing shut-down of the power plant to lock out the controls. To cause restarting of the control sequence the annunciator leaves and contacts $CA_1$ and $RCA_1$ must be manually reset to the normally open positions with the annunciator leaves latched.

The coil of a low generator voltage annunciator LGV is also shown connected in shunt relation with the winding of the master relay MR through the coil of the common lock-out annunciator CA, to lock out the control system, by means of the closed contacts $LV_1$, of a generator low voltage relay LV having a winding shown in Figure 1A connected directly across the generator conductors ACAG and ACNG, the ninety second contacts $K1_{90}$ of the time delay relay K1, the shut-down control conductor 86, conductors 477, 479, 481, 483, 485 and negative control conductor N2 to likewise shut down the power plant and lock out the controls if the generator voltage does not rise to proper value in ninety seconds after starting of the control sequence.

The following annunciator coils and switches therefor also shunt the winding of the master relay MR to cause shut-down of the power plant and lock-out of the controls. A combined high generator voltage and hot generator bearing annunciator coil HGV—HGB, an engine radiator low water level annunciator coil LWL, a combined hot generator winding and low generator frequency annunciator coil HGW—LGF, a low battery annunciator coil LB, a stopping sequence failure and engine over-speed annunciator coil SSF—OS and an engine fuel injector failure annunciator coil IF are shown having one coil terminal connected to the shut-down control line conductor 89 and in series with the common annunciator coil CA. The other terminal of each of the above annunciator coils are connected in series by switches acting in response to any of the conditions indicated by the tickets on the leaves of these annunciators to a conductor 487 connected by a conductor 489 to the negative control conductor N2. These annunciator coils and switches are also connected in series with the common lock-out annunciator coil CA across the winding of the master relay MR to also cause shut-down of the power plant and lock-out of the controls in a similar manner to that previously described.

The coil of the starting sequence failure and engine overspeed annunciator SSF—OS is connected in series with the contacts $VT_4$ which close when the blower valve BV closes to shunt the winding of the master relay MR and locks out the controls.

The switch $IJ_1$ in series with the coil of the injector failure annunciator IF, shown in Figure 1B, is moved to the closed position by the winding of a relay IJ shown at the left of Figure 1A connected in parallel with two normally open contacts $IJT_1$ and $IJT_2$ between the generator conductors ACAG and ACNG. The switches $IJT_1$ and $IJT_2$ are moved to the closed position by a winding of a relay IJT shown connected through rheostats ROS1 and ROS2 to the output terminals of an engine thermo-couple mechanism of a well known type. This mechanism includes a separate thermo-couple for the combustion chamber of each cylinder of the multi-cylinder engine ENG. Half of the thermo-couples are connected in differential relation with the other half and if a fuel injector in one engine cylinder fails this causes cooling of this thermo-couple and application of electrical potential to the winding of the relay IJT. This causes closure of the contacts $IJT_1$ and $IJT_2$ of this relay to cause energization of the winding of the relay IJ and closure of its contacts in series with the coil of the injector failure annunciator IF to shunt the winding of the master relay MR and cause shut-down of the power plant and lock-out of the controls.

The normally open, high generator voltage switch contacts $HG_1$ connected in series with the combined high generator voltage and hot generator bearing annunciator coil HGV—HGB are moved to the closed position by the winding of a relay HG also shown on the left of Figure 1A connected directly across the generator conductors ACAG and ACNG. A thermal switch $HG_2$ on the generator bearing and connected in parallel with the contacts $HG_1$ is closed if the generator bearing overheats to likewise shut down the power plant and lock out the controls.

A low engine fuel pressure annunciator coil LFP is connected in series with a normally closed low fuel pressure switch LFPS and the normally open contacts $TRX_2$ of the relay TRX and the common lock-out annunciator coil and in shunt relation with the winding of the master relay by the shut-down control conductor 89 and conductors 490, 491, 469, 471 and negative control conductor N2. By means of this annunciator LFP and switch LFPS if the engine fuel pressure does not build up to proper value within the ten second time limit of deenergization of the winding of the starting motor SM by operation of the ten second limit relay TRX the power plant will also be shut down and the controls will be locked out.

The remaining annunciator coils, namely an incomplete starting sequence annunciator coil ISS, a combined incomplete starting sequence and exciter failure annunciator coil ISS—EX, a generator field failure annunciator coil GFF, a continuous running starting motor annunciator coil CSM, an engine high water temperature annunciator coil HWT and a combined generator differential and generator ground annunciator coil GG—GD are shown connected directly between the shut-down control conductor 86 and the negative control conductor N2 but are not connected in series with the common lock annunciator coil CA to cause shut-down of the power plant without lock-out of the controls.

The coil of the combined incomplete starting sequence annunciator ISS is shown connected in series with the normally closed contacts $GV_7$, $K2X_6$ and $K1_{90}$ of the generator voltage relay GV, the relay K2X and the time delay relay K1 across the conductors 86 and N2 and therefore in shunt relation with the winding of the master relay MR by conductors 492, 493, 494, 495 and the conductors 483 and 485 previously mentioned. The coil of incomplete starting sequence and exciter failure annunciator ISS—EX is shown connected across the contacts GV7 of the generator voltage relay. With this connection arrangement if the generator voltage does not build up to proper value within ninety seconds after starting of the control sequence as determined by closure of the ninety second contacts K1$_{90}$ of the relay K1 and after closure of the contacts K2X$_6$ of the relay K2X, which occurs upon completion of the loading step of the control sequence by the opening of the contacts LL1, governor load limit switch LL and the power plant will be shut down.

The coil of the generator field failure annunciator GFF is connected in series between the conductors 493 and 466 through the normally closed contacts GF1 of a generator field relay GF and the normally open contacts GV8 of the relay GV by conductors 497 and 499. The winding of the generator field relay GF is shown in Figure 1A connected in series with the generator field GENF between the positive and negative exciter conductors EXP and EXN by conductors 501, 503 and 505. With the above connection arrangement should the field of the generator fail the contacts GF1 will close and a shunt circuit around the winding of the master relay MR will be completed through these contacts, the twenty second contacts K1$_{20}$ of the time delay relay K1, the contacts MX2 of the relay MX, the contacts D3 of the relay D and conductors 86, 493, 497, 499, 466, 463, 465, 209, 211, 213 and N2 to cause shut-down of the power plant.

The coil of the continous running starting motor annunciator CSM is shown connected in snunt relation with the winding of the master relay MR in series with the contacts TRX1 of the relay TRX, controlled by the ten second starting motor limit relay TR, between the shut-down control line conductor 86 and the negative control conductor N2 by conductors 507, 509 and 511. With this connection arrangement if the contacts TRX1 remain closed with the starting motor running continuously the winding of the master relay MR will be shunted to shut down the power plant.

The coil of the engine high water temperature annunciator HWT is connected in series with a high water temperature switch between the shut-down control conductor 86 and the conductor 487 by conductors 513, 515 and 517 and when the engine cooling water temperature switch closes the winding of the master relay MR is shunted and the power plant is shut down.

The coil of the combined generator ground and generator differential annunciator is shown connected in parallel with the contacts GGS of a suitable generator ground relay and the contacts GDR of a suitable differential current relay acting in response to unbalanced current in the generator phase conductors between the shut-down control conductor 86 and the conductor 487. If the contacts GGS or the contacts of the differential relay GDR close the winding of the master relay will be shunted to shut down the power plant.

The synchronous motor driven recloser switch RC, which as described is of a well known type and initially caused energization of the windings of the relays X, Y, D and also the master relay MR by the bridging of the stationary contacts of the recloser switch RC by the drum contact RC1, is also provided with drum contacts RC2 and RC3 which bridge these stationary contacts at two minute intervals to cause three engine cracking intervals of ten seconds duration as determined by the cranking limit, ten second time delay relay TR. When the recloser drum contact RC1 opens the stationary contacts of the recloser in four seconds the relays X, Y and D are deenergized, however the master relay MR remains energized by reason of the holding contacts MR1 of the master relay MR to keep the governor starting solenoid SS and starting motor contactor M energised. At the end of the ten second cranking interval, as determined by the relay TR, the contacts TR1 of the relay TR close in ten seconds to energize the relay TRX and its contacts TRX1 close to shunt the winding of the master relay MR through the starter running continuous annunciator coil CSM. The master relay MR is then deenergized and this opens the circuit to the governor starting solenoid SS and the starting motor contactor M. The synchronous motor RCM of the recloser switch RC however remains energized after deenergization of the relay Y and opening of the contacts Y2 thereof by means of the then closed contacts Z1 of the relay Z and a drum contact RC4 of the recloser switch RC which is now moved into bridging relation with another set of stationary contacts of the recloser switch RC. The contacts Z1 and the stationary contacts of the recloser bridged by the drum contact RC4 are shown connected between the positive control conductor P2 and the direct current input conductor 39 to the inverter IV supplying the recloser motor RCM by conductors 519, 521 and 523. After a two minute interval the drum contact RC2 is then moved into contact with stationary contacts of the recloser to again cause reenergization of the relays X, Y, D and master relay MR for another four second interval to cause another reenergization of the governor starting solenoid SS and starting motor SM and starting motor contactor M to give another ten second engine cranking interval. If the engine ENG does not start in the second ten second interval, the relay TRX will again shunt the winding of the master relay MR and deenergize the governor starting solenoid SS and starting motor contactor M. Two minutes later the drum contact RC3 of the recloser RC will be moved into bridging relation with the stationary contacts of the recloser for another four second interval to provide another ten second energization of the starting motor and governor starting solenoid. One and a half minutes after the end of this third ten second engine cranking interval the recloser drum contact RC5 bridges another pair of stationary contacts of the recloser switch RC to establish a shunt circuit around the winding of the stopping relay IX. This circuit comprises the closed contacts IX1 of the relay IX, the coil of a recloser lock-out annunciator RCA, the normally closed contacts 52Y7 of the relay 52Y and conductors 19, 21, 23, 525, 527 and 529. Energization of the coil of the recloser lock-out annunciator RCA causes the contacts RCA1 to drop out and remain in the closed position. These contacts RCA1 are shown in the right hand side of Figure 1B connected directly across the winding of the master relay MR and these contacts RCA1 must be reset manually to the open position to make the recloser RC reoperative. Deenergization of the relay IX as previously explained in describing stopping by the stop push button PSP, causes the contacts IX3 to shunt the winding of the master relay MR through the normal shut-down annunciator coil IXA to cut out the controls. When the relay IX was shunted the contacts IX2 thereof opened to deenergize the relay Z and the contacts Z3 thereof close to establish a holding circuit to the recloser motor RCM through these contacts and another set of stationary contacts of the recloser RC which are bridged by the recloser drum contact RC6 until the contact RC6 and the other recloser contacts RC1, RC2, RC4 and RC5 are in the starting position shown.

Automatic starting and stopping of the power plant may be accomplished in similar manner by means of the time operated switch TOST by opening the switch 1, shown in Figure 1C, shunting the normally open contacts TOST1 of this time operaated switch, which contacts TOST1 are connected in series with the stopping relay IX and the push button starting and stopping switches PST and PSP by means of the conductors 5, 7, 9, 13, 15 and 17.

To make the time operated switch operative the switch 1 is manually opened and a switch 1A is normally closed. When the contacts of the time switch TOST1 and TOST2 close, a circuit is established to the winding of the relay IX to cause starting in the same manner as when the starting push button PST was closed. This circuit includes the contacts TOST2, the closed switch 1A, the closed contacts IY1 of a relay IY connected in series between the positive conductor P2 and conductor 23 by conductors 531, 533 and 535, the closed push button stopping switch PSP, the closed time switch contacts TOST1, the winding of the relay IX, the resistor 3 and conductors 23, 7, 9, 13, 15, 17 and N2. This causes energization of the winding of the relay IX and closure of the contacts IX1 to maintain this circuit energized as previously described. When the master relay MR is energized the relay 4X is also energized, as previously described, and the contacts 4X2 close. These contacts 4X₂ are connected in series with the winding of a relay 1Y by conductors 537, 539 and 541 between the positive and negative conductors P2 and N2 and the winding of the relay 1Y will be energized to cause the contacts 1Y₁ to open so that when the contacts TOST₁ time switch open the holding circuit to the winding IX will be opened and shut-down of the power plant will take place in the same manner as when the stop push button PSP was opened.

The above described power plant and automatic starting, speed matching, synchronizing and loading controls together with the protective devices for the engine, generator and the control means enable the power plant and control means therefor to operate automatically with infrequent servicing and to shut down and lock out the control system upon occurrence of a major defect in the power plant.

I claim:

1. In a power plant, an engine having a starting motor, a governor operable by the engine to increase the engine speed upon starting and to hold the engine speed at a substantially constant value, a governor starting solenoid energizable to render the governor operative, a current limiting resistor connected to the solenoid, relay means normally shunting the limiting resistor and energizable to render the limiting resistor effective, a starting motor current limiting resistor connected to the starting motor, a second relay means energizable to shunt the starting motor limiting resistor, master relay control means to energize said starting motor, said governor solenoid and both said relay means for the limiting resistors of said solenoid and starting motor, and stopping relay control means connected in potential drop relationship with the starting motor to deenergize said motor upon a decrease in the potential drop across said motor.

2. In a power plant, an engine having a starting motor and an engine speed control governor normally acting to stop the engine, a governor solenoid energizable to start control of the engine speed by said governor, starting relay control means energizable and operable to energize the starting motor and governor solenoid, a synchronous motor driven recloser switch to energize said relay control means intermittently a preselected number of times and to finally deenergize the synchronous motor driven switch, starting control means for the synchronous motor driven recloser switch and starting relay control means, and time delay stopping means connected to said engine starting motor to limit the duration of energization of said starting motor and said starting relay control means.

3. In a prime mover generator power plant for an alternating current power line, an engine having speed regulating means, an alternating current generator driven thereby and a speed matching mechanism to substantially match the frequency of the generator with the power line, said mechanism including a differential gear mechanism comprising a rotatable cage member, an output gear rotatable therein and a pair of input gears meshing with the output gear and operable at the same speed and in opposite directions to prevent rotation of the cage member, a synchronous motor connected to said generator for energization thereby, a second synchronous motor connected to the power line for energization thereby and separate gear means of slightly different ratio interconnecting each of the motors with one of the input gears to stop rotation of said cage member only when the frequency of the generator is slightly greater than that of the power line, and engine speed control means operable by the rotation of said cage to control said engine speed regulating means to maintain the generator frequency at a value slightly higher than that of the power line.

4. In a prime mover generator power plant for supplying power to an alternating current power line, an engine, an alternating current generator driven by the engine, a synchronous motor operated differential speed matching mechanism connected to the generator and to the power line provided with a control element rotatable in opposite directions when the frequency of the generator varies from a value slightly higher than that of the power line, said engine having reversible fuel regulating means connected to said control element, a circuit breaker, circuit breaker closing means operable to close the circuit breaker to connect the generator with the power line, synchronizing means connected to the generator and to the power line to control operation of the circuit breaker closing means when the frequency and phase angle of the generator voltage is substantially equal to that of the power line and means operable upon closure of the circuit breaker and connected in controlling relation with the reversible engine fuel regulating means to control operation of the fuel regulating means to increase the power output of the power plant to the power line.

5. In a power plant for an alternating current power line, an engine having a starting motor and fuel varying means, an alternating current generator and an engine governor driven by the engine, said governor normally holding the engine fuel varying means in an off position and operable to move the fuel varying means to increase the engine fuel and the engine speed and frequency of the generator voltage to a value substantially equal to that of the power line, a circuit breaker movable to a closed position to connect the generator with the power line, circuit breaker closing mechanism, differential speed matching means driven by separate synchronous motors adapted to be connected to the generator and power line respectively and including a member rotatable in opposite directions only when the frequency of the generator differs from a value slightly higher than that of the power line to control the engine fuel carrying means, synchronizing means adapted to be connected to the generator and to the power line to control the circuit breaker closing mechanism only when the phase angle of the generator voltage is substantially equal to that of the power line, voltage relay means connected to the generator to connect the synchronous motors of the speed matching mechanism and the synchronizing means with the generator and power line when the generator voltage builds up and other control means operable upon closure of the circuit breaker to also control operation of the engine fuel varying means to increase the power supplied by the generator to the power line.

6. In a power plant, an internal combustion engine having a scavenging and supercharging blower driven thereby, said blower having a normally open air inlet valve, a solenoid energizable to move said valve to the closed position to stop the engine, said air inlet valve being manually movable to the open position from the closed position, a current limiting resistor for the solenoid and switching means operable by the solenoid to connect the limiting resistor with the solenoid to prevent overheating thereof.

7. In a power plant, an internal combustion engine having a scavenging and supercharging blower provided with a manually opened air inlet valve, a solenoid energizable to close said valve to shut down the engine, switching means operable upon overspeeding of the engine to energize the solenoid, and other switching means operable upon closure of said valve to deenergize said solenoid.

8. In a generating electric power plant for supplying an electric power line, an internal combustion engine, a generator driven thereby, normally open circuit breaker means, means to close said circuit breaker to connect the generator with the power line, a latch to retain the circuit breaker closed, and electrical means for releasing the latch to permit opening of the circuit breaker, said engine having a scavenging and supercharging air blower provided with a manually opened air inlet valve, a solenoid energizable to close said valve to shut down the engine, a governor acting in response to the speed of the engine to control the engine speed, said governor having a switch operable upon overspeeding of the engine to energize the valve closing solenoid and a second switch operable by the governor upon a reduction in engine speed to energize the electrical circuit breaker latch releasing means.

9. In a generating electric power plant for supplying power to an electric power line, an internal combustion engine having a governor driven thereby to regulate the engine speed, said governor having a starting solenoid energizable to cause an increase in the engine speed and deenergizable to stop the engine, a circuit breaker having a latch to retain the circuit breaker closed to connect the generator with the power line, electrical means energizable to release the circuit breaker latch, master relay means energizable to energize the governor starting solenoid, switching means to energize the master relay means, a plurality of shunting circuits for said master relay means to deenergize the governor starting solenoid to stop the engine, each of said shunting circuits including an electrical annunciator having a coil and switch means to energize said coil, certain of said switch means acting in response to engine defects and other of said switches acting in response to generator defects, and switching means operable by said governor at low engine speeds to energize the electrical circuit breaker latch releasing means to disconnect the generator from the power line.

10. In a generating electric power plant for supplying power to an electric power line, an internal combustion engine having a governor operable to regulate the engine fuel to regulate the engine speed and load, a governor starting solenoid energizable to start regulation of the engine by the governor and deenergizable to cause engine shut-down, a generator driven by the engine, a circuit breaker having a latch to retain the circuit breaker closed to connect the generator with the power line, electrical means energizable to release the circuit breaker latch, a master relay having a winding and contacts to energize the governor starting solenoid when the winding is energized and other contacts to deenergize the governor starting solenoid to cause engine shut-down when the master relay is shunted and a plurality of shunting circuits for the master relay winding, each shunting circuit including an annunciator coil and switching means operable upon a defective operating condition of the engine and generator power plant, a common annunciator having a coil connected in series with certain of said first mentioned annunciator coils and contacts operable by said common annunciator coil to shunt the master relay winding, and switching means operable by the governor at low engine speed and load to energize said circuit breaker latch releasing means.

11. In a generating electric power plant for an alternating current power line, a diesel engine having fuel regulating means, an alternating current generator driven by the engine, a circuit breaker having electrical means energizable to close the circuit breaker and to connect the generator with the power line, a governor driven by the engine to control the fuel varying means to vary the speed and load of the engine, said governor having reversible electrical speed setting means and load setting means, no load and full load synchronous speed limiting switches operable by the fuel varying means when the generator is operating at no-load and full load synchronous speed, and a starting solenoid energizable to start regulation of the engine by the governor and deenergizable to cause engine shut-down, engine speed matching control means acting in response to a slight differential in frequency between the generator and power line to control said reversible electric means, synchronizing means acting only when the generator voltage and phase angle is substantially equal to the power line to energize the electrical circuit breaker closing means, and master relay means energizable to energize said governor starting solenoid, said speed matching means and said synchronizing means, switching means operable by closing of the circuit breaker to energize said reversible electric means to cause movement of the engine fuel regulating means by said governor to the full load synchronous speed position and to operate said governor full load synchronous limit switch to deenergize said reversible electric means.

12. In a generating electric power plant for supplying an electric power line, an internal combustion engine, a generator driven thereby, a normally open circuit breaker closable to connect the generator with the power line, said circuit breaker having a latch to retain said circuit breaker closed, electrical release means for said latch, said engine having fuel regulating means and an engine governor normally acting to move said fuel regulating means to the off position and operable to move said fuel regulating means to cause operation of said engine at no load speed, said governor having a starting solenoid energizable to cause operation of the governor, and electrical speed setting means to cause movement of the fuel regulating means by the governor between no load and full load speed positions and control means operable by closing of the circuit breaker to energize the governor electrical speed setting means to cause movement of said engine fuel regulating means to the full load position.

13. In a generating electric power plant supplying power to an electric power line, an internal combustion engine having fuel varying means, a governor driven by the engine, said governor having reversible electric speed setting means to operate the engine fuel varying means and vary the engine speed and load and a solenoid energizable to maintain the governor operable and deenergizable to cause movement of the fuel varying means by the governor to the off position to shut down the engine, a circuit breaker to connect the generator with the power line and having a latch to maintain the circuit breaker closed, electrical latch releasing means to permit opening of the circuit breaker, control means operable upon closure of the circuit breaker to retain the governor solenoid energized and to energize the reversible electric governor speed setting means to increase the engine speed and load, an engine starting motor, master relay control means to initially energize the starting motor and governor solenoid, time operated switch means to energize and deenergize said master relay control means, control means operable upon deenergization of the master relay control means to energize said governor electrical speed setting means to reduce the engine speed and load, and switching means operable upon movement of the engine fuel varying means to reduce the engine speed to energize the electrical circuit breaker latch releasing means and to deenergize said governor solenoid and said governor electrical speed setting means in order to disconnect the generator from the power line only when operating at low speed and load and to shut down the engine.

14. In a power plant for an electric power line, an engine, a generator driven thereby, an engine starting motor, stopping control means connected to the starting motor to stop said motor upon operation of the engine, engine speed control means including a solenoid deenergizable to shut down the engine, electrical master control means energizable and operable to energize said electrical engine starting motor and said solenoid to cause starting and acceleration of said engine, electrically operated recloser switch means to intermittently energize the master control means a preselected number of times, a generator driven by the engine, a circuit breaker having electrically operated circuit breaker closing means, a latch to hold the circuit breaker closed to connect the generator with the power line, means responsive to the voltage of the generator and power line to energize the circuit breaker closing means, a plurality of electrical annunciators and switching means for energizing said annunciators ad deeergizing means for energizing said annunciators ad deeergizing means to cause engine shut down, certain of said switching means acting in response to defects in the engine and other of said switching means acting in response to defects in said generator.

15. In a generating electric power plant for supplying an electric power line, an internal combustion engine having fuel varying means, a generator driven by the engine, a normally open circuit breaker having a latch to retain the circuit breaker closed in order to connect the generator with the power line, electrical circuit breaker closing means, electrical circuit breaker latch releasing means, a governor driven by the engine to operate the fuel varying means, a governor starting solenoid energizable to cause movement of the fuel varying means to a no load speed position, electrical speed setting means for the governor to cause movement of the fuel varying means between no load and full load speed positions, no load and full load speed limit switches operable by the fuel varying means to deenergize said speed setting means, a generator voltage relay to energize the electrical circuit breaker closing means, master relay means to energize the governor solenoid, relay means to maintain the solenoid energized, switching means operable upon closure of the circuit breaker to energize said relay maintaining said solenoid energized and to energize said electrical speed setting means to cause operation of the engine at full load speed, switching means to deenergize said master relay means, relay means operable upon deenergization of said master relay means to energize said speed setting means through said relay means retaining said governor solenoid energized to cause operation of the engine at no load speed to operate said no load limit switch, said no load limit switch also serving to energize said electrical circuit breaker latch releasing means to disconnect said generator from the power line when the engine is operating at no load speed.

16. In a generating electric power plant for supplying power to an alternating current power line, an internal combustion engine having fuel varying means, a generator driven by the engine, a normally open circuit breaker having a latch to retain the circuit breaker closed to connect the generator with the power line, electrical circuit breaker closing means, a governor driven by the engine normally acting to move the fuel varying means to maintain the generator operative at a frequency substantially equal to that of the power line, electrical speed setting means for the governor to control movement of the fuel varying means to the full load position, a full load switch operable upon movement of the fuel varying means to the full load position to deenergize the electrical speed setting means, differential electrical speed matching means operable upon variation in the generator frequency from that of the power line to control the electrical speed setting means and hold the generator frequency substantially equal to that of the power line, electrical synchronizing means acting when the phase angle of the generator voltage is substantially equal to the power line to energize the electrical circuit breaker closing means, interconnected generator and power line voltage relays operable in combination to control energization of said electrical speed matching and said synchronizing means, said generator voltage relay means acting separately to energize said electrical circuit breaker closing means and switching means operable upon closure of the circuit breaker to energize the electrical speed setting means to cause operation of the engine at full load.

17. In a generating electric power plant supplying power to an alternating current power line, an internal combustion engine having fuel varying means, a generator driven by the engine, a circuit breaker, electrical circuit breaker closing means to connect the generator with the power line, an engine fuel governor driven by the engine normally acting to cause operation of the generator at no load and at a frequency substantially equal to that of the power line, said governor having electrical speed setting means to cause movement of the engine fuel regulating means between no load and full load positions, a full load limit switch operable by the fuel varying means to deenergize the electrical speed setting means, differential speed matching mechanism acting in response to a variation in generator frequency from a preselected value slightly higher than that of the power line to control the governor frequency at said preselected value and no load, electrical synchronizing means acting when the phase angle of the generator voltage is substantially equal to that of the power line to control said electrical circuit breaker closing means, generator and power line voltage responsive means to control operation of said electrical speed matching and synchronizing means, time delay means also connected with said electrical synchronizing means and electrical circuit breaker closing means to delay closure of the circuit breaker by said synchronizing means and switching means operable upon closure of the circuit breaker to energize said electrical speed setting means to cause operation of said engine and generator power plant at full load.

18. In a prime mover generator power plant for an alternating current power line, an engine having fuel regulating means and an electric starting motor, means connected to the starting motor to stop said motor upon starting of the engine, a generator driven by the engine, a circuit breaker having electrical circuit breaker closing means to connect the generator with the power plant, a latch to hold the circuit breaker closed and electrical latch releasing means, an engine driven governor to control the fuel varying means normally acting to hold the fuel varying means in the off position, electrical governor starting means to start governor control of the fuel varying means to cause operation of the engine and generator at no load synchronous speed, electrical governor speed setting means to cause movement of the fuel varying means by the governor between no load and full load synchronous speed positions, no load and full load limit switching means for the electrical speed setting means operable by the fuel varying means, said no load switching means also serving to energize said electrical latch closing means for said circuit breaker, electrical speed matching means acting upon a slight variation in the speed of the generator from the synchronous speed thereof with respect to the power line to control the governor speed setting means and maintain the governor at substantially no load synchronous speed, electrical synchronizing means acting when the phase angle of the generator voltage is substantially equal to that of the power line to control the electrical circuit breaker closing means, generator and power line voltage responsive means connected to said starting motor stopping means to control operation of said electrical speed matching and synchronizing means, means operable upon closure of the circuit breaker to control energization of said speed setting means to cause operation of the engine and generator at full load, a relay connected with said circuit breaker and said no load limit switch and energizable upon closure of said circuit breaker to energize the electrical governor starting means and deenergize said electrical governor starting means to deenergize said electrical governor starting means, synchronous electrical motor operated time delay switching means operable in sequence to protect the engine after starting and full load operation thereof, said time delay switching means being connected to and operable by said starting motor stopping means, master relay control means having contacts and a winding energizable to close certain contacts to energize the electrical engine and governor starting means, certain other contacts being closed upon shunting of the master relay winding to energize said speed setting means to cause operation of the engine at no load synchronous speed, electrical synchronous motor recloser switch means to control intermittent energization of the master relay winding a preselected number of intervals, said recloser switch means also having restarting and stopping contacts for the recloser switch motor, starting switch means operable to energize the recloser switch motor, and a plurality of shunting means for the master relay winding to shut down the engine and generator power plant, each of said shunting means including an annunciator coil and switch means acting upon defective operation of the engine and generator power plant to shut down the power plant and energize the annunciator coil, certain of said switch means acting upon defective operation of said engine and generator and connected to said time delay switching means to act in combination therewith to shut down the power plant.

19. In a power plant, an engine, a governor driven thereby to control the engine speed, said governor having a solenoid energizable to render the governor operative and deenergizable to cause shut down of the engine by the governor, master control means energizable and operable to retain said governor solenoid operative, a generator driven by the engine, a plurality of shunting circuits for the master control means to render said means inoperative and thereby cause shut down of said engine, certain of said shunting circuits including switching means operable in response to defective operating characteristics of said engine and other of said circuits including switching means operable on defective operating characteristics of said generator, and an annunciator having a coil connected with each of said switching means energizable upon operation thereof to indicate the particular defective operating characteristics causing shut down of the engine.

20. In a power plant for supplying power to a power line, an engine, a generator driven thereby, a circuit breaker having closing and opening means to connect the generator with the power line and to disconnect the generator therefrom, a starting motor for the engine, means connected with said starting motor to deenergize said motor, an engine governor normally acting to stop said engine, a solenoid energizable to render the governor operative to cause operation of the engine and generator at no load speed, said governor having electrical speed setting means to cause operation of the governor at no load and full load speeds and no load and full load limit switches operable by the governor to deenergize the electrical speed setting means, said no load limit switch also serving to control said circuit breaker opening means and to deenergize said governor solenoid, control means operable upon closure of the circuit breaker to energize the electrical speed setting means to cause operation of the engine and generator at full load speed and to retain the governor solenoid energized, electrical master control means deenergizable to energize the speed setting means to cause operation of the engine and generator at no load and energizable to energize said engine starting motor and said governor solenoid, generator voltage responsive means connected to said means deenergizing said starting motor to control said circuit breaker closing means, a motor operated recloser switch having contacts to intermittently energize said master control means and also having stopping contacts to stop said recloser switch motor, engine starting switch means to energize said recloser switch motor, engine stopping control means operable to shunt said master control means, and an electrical annunciator having a coil and contacts operable upon energization of said coil to shunt said master control means to prevent starting of said engine starting motor, and means interconnecting said annunciator coil and said stopping contacts of said recloser switch in shunt relation with said master control means to energize said annunciator coil upon stopping of said recloser switch motor after failure of the engine to start, said annunciator contacts being manually movable to prevent shunting of the master control means to allow restarting of said engine starting motor.

21. In a power plant for supplying power to a power line, an engine, a generator driven thereby, a circuit breaker having closing and opening means to connect the generator with the power line and to disconnect the generator therefrom, a starting motor for the engine, means connected with said starting motor to deenergize said motor, an engine governor normally acting to stop said engine, a solenoid energizable to render the governor operative to cause operation of the engine and generator at no load speed, said governor having electrical speed setting means to cause operation of the governor at no load and full load speeds and no load and full load limit switches operable by the governor to deenergize the electrical speed setting means, said no load limit switch also serving to control said circuit breaker opening means and to deenergize said governor solenoid, control means operable upon closure of the circuit breaker to energize the electrical speed setting means to cause operation of the engine and generator at full load speed and to retain the governor solenoid energized, electrical master control means deenergizable to energize the speed setting means to cause operation of the engine and generator at no load and energizable to energize said engine starting motor and said governor solenoid, generator voltage responsive means connected to said means deenergizing said starting motor to control said circuit breaker closing means, a motor operated recloser switch having contacts to intermittently energize said master control means and also having stopping contacts to stop said recloser switch motor, engine starting switch means to energize said recloser switch motor, engine stopping control means operable to shunt said master control means, and a plurality of protective means for shunting said master control means to stop said engine upon defective conditions of engine and generator operation, certain of said protective means including electrical annunciators and switch means operable upon occurrence of major defects in the engine and generator to energize said annunciators upon shunting of the master control means and at least one of said annunciators having contacts operable thereby to shunt said master control means to prevent restarting of the engine until said contacts are reset manually, certain other of said protective means including electrical annunciators and switch means operable upon other defects in the engine and generator to stop the engine and permit restarting.

22. In a power plant for supplying power to a power line, an engine, a generator driven thereby, a circuit breaker having closing and opening means to connect the generator with the power line and to disconnect the generator therefrom, a starting motor for the engine, means connected with said starting motor to deenergize said motor, an engine governor normally acting to stop said engine, a solenoid energizable to render the governor operative to cause operation of the engine and generator at no load speed, said governor having electrical speed setting means to cause operation of the governor at no load and full load speeds and no load and full load limit switches operable by the governor to deenergize the electrical speed setting means, said no load limit switch also serving to control said circuit breaker opening means and to deenergize said governor solenoid, control means operable upon closure of the circuit breaker to energize the electrical speed setting means to cause operation of the engine and generator at full load speed and to retain the governor solenoid energized, electrical master control means deenergizable to energize the speed setting means to cause operation of the engine and generator at no load and energizable to energize said engine starting motor and said governor solenoid, generator voltage responsive means connected to said means deenergizing said starting motor to control said circuit breaker closing means, a motor operated recloser switch having contacts to intermittently energize said master control means and also having stopping contacts to stop said recloser switch motor, engine starting switch means to energize said recloser switch motor, engine stopping control means operable to shunt said master control means, and engine and generator protective means connected in shunt relation with said master control means to stop said engine upon occurrence of defects in the engine and generator between the time the starting motor is deenergized and the circuit breaker closing means operates, said protective shunting means comprising electrical time delay switching means connected to and energized by said starting motor deenergizing means and deenergized by closure of said circuit breaker, protective switching means operable in response to defects in the engine and generator and electrical annunciators connected to and energized by said time delay and protective switching means upon shunting of said master control means, said protective switching means being operable upon defective operating conditions of said engine and said generator.

23. In a power plant for supplying power to a power line, an internal combustion engine having a manually opened combustion air inlet valve, a solenoid energizable to close said valve to stop said engine, a switch means operable by movement of said valve to the closed position to deenergize said solenoid, a generator driven by the engine, a circuit breaker having closing and opening means to connect and disconnect the generator with the power line, an engine starting motor, means connected with the starting motor to deenergize said motor, an engine governor normally acting to stop said engine, a solenoid energizable to render the governor operative to control operation of the engine at no load, said governor having electrical speed setting means to control operation of the engine at no load and full load and no load and full load limit switches operable by the governor to deenergize the electrical speed setting means, said no load limit switch serving to deenergize said governor solenoid to stop said engine and to control operation of said circuit breaker opening means, control means operable upon closure of said circuit breaker to maintain said governor solenoid energized and to energize said governor electrical speed setting means to cause operation of the engine and generator at full load, electrical master control means deenergizable to energize said electrical speed setting means to cause operation of said engine and generator at no load and energizable to control said engine starting motor and said governor solenoid, generator voltage responsive means to control said circuit breaker closing means, a motor operated recloser switch having starting contacts to start said recloser switch motor, other contacts to intermittently energize said master control means and stopping contacts to stop said switch motor, switch means to start said recloser switch motor, stopping switch means to shunt said master control means to stop said engine and generator, and an engine and generator protective stopping circuit to energize said engine air inlet valve solenoid to close said valve, said stopping circuit including said valve solenoid, said master control means, said generator voltage responsive means, said no load limit switch, and said contacts operable by said valve, and time delay switching means to delay energization of said valve solenoid.

24. In a generating electric power plant for supplying power to an alternating current power line, an engine having fuel varying means, an alternating current generator driven by the engine, a circuit breaker having a latch to retain the circuit breaker closed to connect the generator with the power line, electrical circuit breaker closing means, electrical circuit breaker latch releasing means, a governor driven by the engine normally acting to move the fuel varying means to a no load synchronous speed position, said governor having a solenoid energizable to maintain the governor operative and deenergizable to cause movement of the fuel varying means by the governor to a fuel cut-off position, electrical governor speed setting means to cause movement of the fuel varying means between no load and full load synchronous speed positions and no load and full load limit switches operable by the fuel varying means to deenergize the electrical speed setting means, master relay means normally acting to energize said electrical speed setting means to cause operation of the engine and generator at no load synchronous speed and energizable and operable to energize said governor solenoid, said no load limit switch also acting to deenergize said governor solenoid and to energize said electrical circuit breaker latch releasing means, electrical engine speed matching means acting in response to a change in generator frequency from a predetermined value slightly higher than that of the power line to energize the electrical speed setting means and maintain the generator frequency at said preselected value, electrical synchronizing means operable when the phase angle of the generator voltage is substantially equal to that of the power line to energize the circuit breaker closing means, generator voltage relay means to energize the electrical speed matching and synchronizing means, relay means to maintain the governor solenoid energized, switching means operable upon closure of the circuit breaker to energize said relay and said electrical speed setting means to cause operation of the engine and generator at full load synchronous speed, means for shunting said master relay means to cause a reduction in the engine and generator speed and load to the no load synchronous speed value to release the circuit breaker latch and deenergize the governor solenoid by said no load limit switch.

25. In a generating electric power plant for supplying power to an alternating current power line, an engine having fuel varying means, an alternating current generator driven by the engine, a circuit breaker having a latch to retain the circuit breaker closed to connect the generator with the power line, electrical circuit breaker closing means, electrical circuit breaker latch releasing means, a governor driven by the engine normally acting to move the fuel varying means to a no load synchronous speed position, said governor having a solenoid energizable to maintain the governor operative and deenergizable to cause movement of the fuel varying means by the governor to a fuel cut-off position, electrical governor speed setting means to cause movement of the fuel varying means between no load and full load synchronous speed positions and no load and full load limit switches operable by the fuel varying means to deenergize the electrical speed setting means, master relay means normally acting to energize said electrical speed setting means to cause operation of the engine and generator at no load synchronous speed and energizable and operable to energize said governor solenoid, said no load limit switch also acting to deenergize said governor solenoid and to energize said electrical circuit breaker latch releasing means, electrical engine speed matching means acting in response to a change in generator frequency from a predetermined value slightly higher than that of the power line to energize the electrical speed setting means and maintain the generator frequency at said preselected value, electrical synchronizing means operable when the phase angle of the generator voltage is substantially equal to that of the power line to energize the circuit breaker closing means, generator voltage relay means to energize the electrical speed matching and synchronizing means, and time delay relay means operable by said voltage relay means to delay energization of the electrical circuit breaker closing means by said synchronizing means, relay means to maintain the governor solenoid energized, switching means operable upon closure of the circuit breaker to energize said relay and said electrical speed setting means to cause operation of the engine and generator at full load synchronous speed, means for shunting said master relay means to cause a reduction in the engine and generator speed and load to the no load synchronous speed value to release the circuit breaker latch and deenergize the governor solenoid by said no load limit switch.

26. A power plant for supplying power to an electric power line including the combination of an engine, a starting motor for cranking of the engine and a generator driven by the engine, engine speed control means including a solenoid de-energizable to shut down the engine, starting control means for said starting motor and said solenoid including starting current limiting means in circuit with said motor, time delay means for shunting said current limiting means after starting of said motor, stopping control means connected in circuit with said starting motor and stopping said motor upon operation of said engine, a circuit breaker having electrically operated closing means for connecting said generator with said power line upon energization of the circuit breaker closing means, and means responsive to the voltage of said generator and said power line to energize said circuit breaker closing means.

27. A power plant for supplying power to an electric power line including the combination of an engine, a starting motor for cranking of the engine and a generator driven by the engine, engine speed control means including a solenoid de-energizable to shut down the engine, starting relay control means to energize said starting motor and said solenoid, a definite time-operated reclosure switch to energize said starting relay control means intermittently a pre-selected number of times and providing a corresponding number of successive cranking periods during which said starting motor may be energized to crank said engine, time delay relay stopping means in circuit with said motor and limiting the duration of energization thereof during each of said cranking periods in the event said engine fails to operate, stopping relay control means in circuit with said starting motor to stop said motor upon operation of said engine, a circuit breaker having electrically operated circuit closing means connecting said generator with said power line upon energization of said circuit closing means thereof, and means responsive to the voltage of said generator and said power line energizing said circuit breaker closing means.

References Cited in the file of this patent

UNITED STATES PATENTS

| Number | Name | Date |
|---|---|---|
| Re. 19,966 | Stivender | May 12, 1936 |
| 1,301,471 | McFeaters | Apr. 22, 1919 |
| 1,521,004 | Bradshaw et al. | Dec. 30, 1924 |
| 1,685,746 | Nye | Sept. 25, 1928 |
| 1,685,747 | Nye | Sept. 25, 1928 |
| 1,726,908 | Levy | Sept. 3, 1929 |
| 1,829,427 | Wensley | Oct. 27, 1931 |
| 1,873,976 | Montgomery et al. | Aug. 30, 1932 |
| 1,998,443 | Carpenter | Apr. 23, 1935 |
| 2,006,524 | Strong | July 2, 1935 |
| 2,010,960 | Pogue | Aug. 13, 1935 |
| 2,100,364 | Stivender | Nov. 30, 1937 |
| 2,170,918 | Strong | Aug. 29, 1939 |
| 2,178,098 | Elkin | Oct. 31, 1939 |
| 2,197,726 | Johnson | Apr. 16, 1940 |
| 2,208,299 | Marcus | July 16, 1940 |
| 2,232,495 | Strong | Feb. 18, 1941 |
| 2,294,152 | Yates et al. | Aug. 25, 1942 |
| 2,374,251 | Wallace | Apr. 24, 1945 |
| 2,392,469 | Exner | Jan. 8, 1946 |
| 2,424,447 | Gantenbein et al. | July 22, 1947 |